R. DURAND.
THRASHING-MACHINE.
No. 191,280. Patented May 29, 1877.
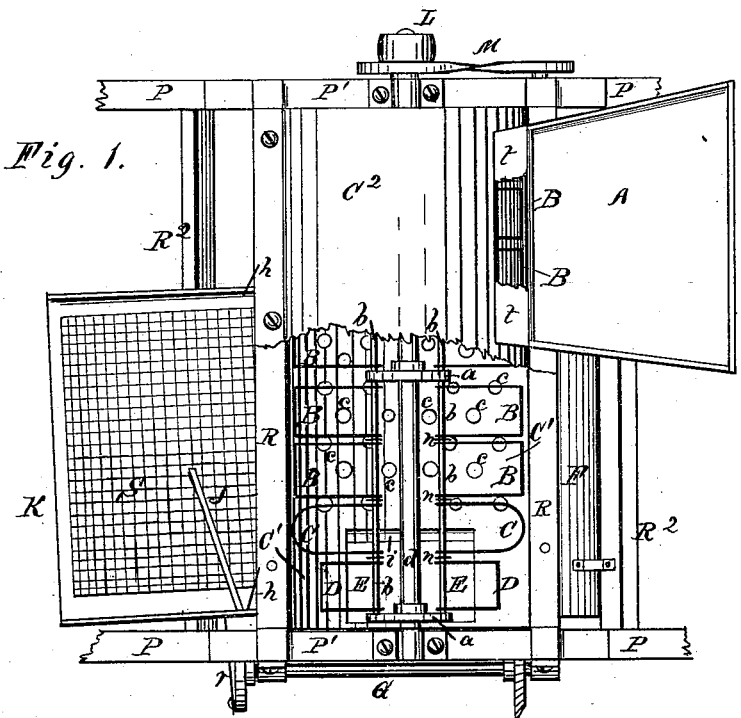
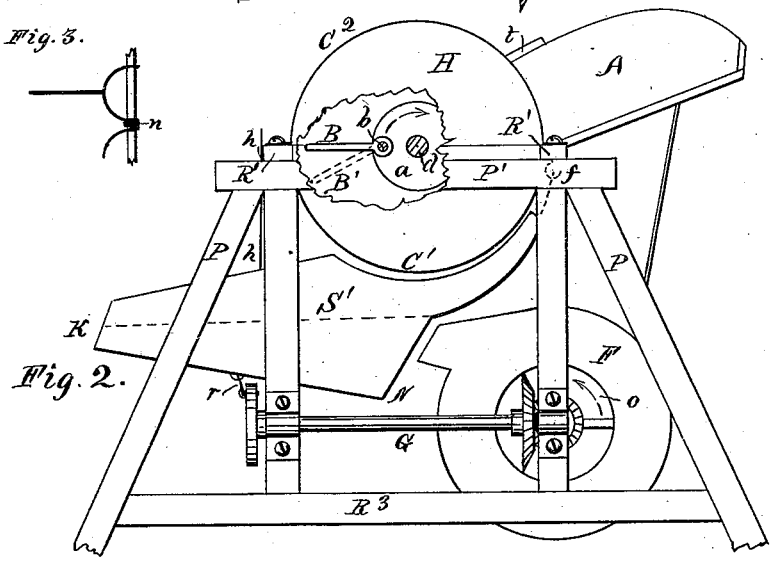
Witnesses.
J. R. Hoppe.
J. Chase.
Inventor.
R. Durand
By Wm. Loughborough
Atty.

UNITED STATES PATENT OFFICE.

RUFUS DURAND, OF CANANDAIGUA, NEW YORK.

IMPROVEMENT IN THRASHING-MACHINES.

Specification forming part of Letters Patent No. 191,280, dated May 29, 1877; application filed October 18, 1876.

*To all whom it may concern:*

Be it known that I, RUFUS DURAND, of Canandaigua, in the county of Ontario and State of New York, have invented a new and useful Machine for Thrashing or Shelling Corn and other Grain; and I do hereby declare that the following is a full, clear, and exact description thereof, reference being had to the accompanying drawings, making part of this specification, in which—

Figure 1 is a top sectional view, a portion of the covering or case of the thrashing-cylinder being removed. Fig. 2 is a sectional end view of the same, having a portion of one head of the cylinder-case broken away. Fig. 3 represents modifications of the beaters or teeth of the thrashing-cylinder.

This invention consists in the employment of swinging or vibrating teeth of clevis form or U shape for grain-thrashing cylinders.

I provide a suitable frame, composed principally of the posts P, plates P' and R$^1$, and girts R$^2$ and R$^3$. The thrashing-cylinder, which consists of a main shaft, $d$, provided with two or more heads, $a$, and as many tooth-shafts $b$ as desired, is hung in suitable bearings upon the plates P'. The lower half C$^1$ of the concave is preferably composed of sheet metal, and provided with an opening, E, at the opposite end from the feeding-hopper A. This opening may be provided with an adjustable slide, $i$, whereby its capacity for discharging the cobs may be increased or diminished as may be necessary. The concave is also provided with several rows of perforations, $c$, extending half its length or more. These perforations should be large enough and sufficiently frequent to permit the thrashed or shelled corn or grain to be readily discharged from the concave as rapidly as it is separated from the cob. The cap C$^2$ of the concave may be formed of metal or wood.

The width of the separator-shoe S' is equal to about two-thirds of the length of the cylinder. There may be a curved chute attached to the under side of the concave near each side of the shoe, to conduct the grain, &c., into it. The shoe is pivoted to the plate R, as shown by dotted lines at $f$, Fig. 2. The screen end is suspended from the plate R$^1$ by the adjustable hangers $h$. The diagonal guard J may be placed upon the screen S, to equalize the spread of the grain, &c., thereon, if necessary.

The shoe S' is vibrated by means of the rod $r$ and the rotating shaft G, the latter being driven by suitable bevel-gears from the fan-shaft. The latter is driven in the direction indicated by the arrow $o$ in Fig. 2, by the crossed belt M from the cylinder-shaft $d$. The fan F is arranged as shown in Fig. 2.

The rods $b$, upon which the swinging teeth B C D are hung, are supported by the heads $a$ upon the shaft $d$. Two or more heads should be employed, according to the length of the cylinder required. There may be two or more rods, $b$, employed to hinge the teeth or beaters upon. These teeth may be formed, as shown at B, each end being provided with an eye to insert the rod $b$ through, as indicated in Fig. 2. There may be washers $n$ placed between the contiguous arms of adjoining teeth, which latter should be just long enough to swing entirely clear of the concave and cylinder-cap. It might be found desirable to use U-shaped teeth, as shown at C, Fig. 1. The feeding or hopper end of the cylinder is, preferably, elevated somewhat above the opposite end, which acts to convey the ears, &c., acted upon by the teeth or beaters, toward the discharge-opening E; or, which would probably effect the same result, the heads $a$ might be fixed upon the shaft $d$ with the holes for the shafts $b$ in those heads toward the hopper end of the cylinder more or less in advance, in relation to the direction of rotation of those toward the discharge, which would place the rods $b$ spirally around the cylinder. The beaters or teeth at the lower end of the cylinder may be shorter than the others when the machine is to be used for shelling or thrashing corn, which, it is thought, will facilitate the discharge of the cobs through the opening E. A portion of the cap $t$ of the feed-hopper A is broken away in Fig. 1, showing the opening through the cylinder-cover C$^2$, through which the ears are fed. L is a driving-pulley.

It will be seen that the centrifugal force of the rapidly-revolving cylinder keeps the beaters or teeth extended, as shown, except when they are thrown out of line, as indicated by dotted lines at B', by striking an ear of corn or other substance being operated upon; and as soon as they have passed the same are immediately restored to such position by the same force. This construction of the thrashing-cylinder gives greater striking-surface at the end of the tooth than the known forms, without increasing its weight, and, consequently, the danger of crushing the grain, and that also arising in such machines from centrifugal force. Both the form and swinging attachment of the beaters co-operate to obtain several advantages. Were the teeth solid and of the width necessary to obtain the striking-surface possessed by my beaters, the machine would be reduced in internal capacity and efficiency, as the material can, with my form, escape through the open portion of the teeth, and thus the casing can be kept fuller than with the broad solid teeth, and the increased weight of the solid teeth over my form would necessitate a more expensive and heavier mode of hinging the beaters to the cylinder to obviate centrifugal force. The beaters would, moreover, be liable to crack the kernels of grain, &c., since their being hinged to the cylinder allows their weight to modify their action materially on the grain.

This construction of the thrashing-cylinder is especially adapted to thrashing corn, beans, pease, &c., where the blow extended along the whole length of an ear or pod is that much more rapid and effective than where only a point strikes, and, it is believed, is equally applicable for thrashing smaller grain.

It is thought desirable to make the teeth at the hopper end somewhat shorter than the others. It might also be found preferable to omit the head H, and make the discharge through the end of the cylinder, and hang the shoe accordingly.

What I claim as my invention is—

As an improvement in grain-thrashing cylinders, the swinging clevis or U-shaped teeth or beaters, constructed substantially as and for the purposes shown and described.

RUFUS DURAND.

Witnesses:
WM. S. LOUGHBOROUGH,
N. A. PIERCE.